United States Patent
Da Silva et al.

(10) Patent No.: US 8,805,313 B2
(45) Date of Patent: Aug. 12, 2014

(54) MAGNITUDE AND PHASE RESPONSE CALIBRATION OF RECEIVERS

(71) Applicant: Tektronix, Inc., Beaverton, OR (US)

(72) Inventors: Marcus K. Da Silva, Portland, OR (US); Gordon A. Olsen, Tigard, OR (US); Richard M. Crouch, Tigard, OR (US); Franklin M. Borden, Sherwood, OR (US)

(73) Assignee: Tektronix, Inc., Beaverton, OR (US)

( * ) Notice: Subject to any disclaimer, the term of this patent is extended or adjusted under 35 U.S.C. 154(b) by 36 days.

(21) Appl. No.: 13/662,294

(22) Filed: Oct. 26, 2012

(65) Prior Publication Data

US 2014/0120857 A1    May 1, 2014

(51) Int. Cl.
*H04B 1/00* (2006.01)
*H04B 17/00* (2006.01)

(52) U.S. Cl.
USPC .......................... 455/226.1; 455/307; 375/226

(58) Field of Classification Search
USPC .......... 455/67.11, 67.14, 226.1, 226.2, 226.4, 455/266, 296, 307, 334; 375/343, 344, 375, 375/376, 224, 226, 229
See application file for complete search history.

(56) References Cited

U.S. PATENT DOCUMENTS

| | | | |
|---|---|---|---|
| 5,337,014 A * | 8/1994 | Najle et al. | ................. 455/226.1 |
| 5,656,929 A | 8/1997 | Humpherys | |
| 7,477,875 B2 * | 1/2009 | Zhang et al. | ................ 455/67.11 |
| 2003/0176174 A1 * | 9/2003 | Seppinen et al. | .......... 455/226.1 |
| 2009/0149137 A1 | 6/2009 | Rockwell et al. | |
| 2010/0067634 A1 * | 3/2010 | Furman et al. | ................. 375/376 |
| 2012/0157005 A1 | 6/2012 | Bardin et al. | |

FOREIGN PATENT DOCUMENTS

WO    03021826 A1    3/2003

OTHER PUBLICATIONS

European Search Report for Application No. 13190234.8 dated Nov. 28, 2013, 7 pages.

* cited by examiner

*Primary Examiner* — Thanh Le
(74) *Attorney, Agent, or Firm* — Marger, Johnson & McCollom, P.C.

(57) ABSTRACT

An integrated calibrator provides for magnitude and phase response calibration of RF receivers to produce amplitude flatness and phase linearity across the frequency range of the RF receiver by using a simple square law diode detector and a frequency-stepped two-tone source. A two-tone source generator provides two sinusoidal signals separated by a specified frequency delta about a center frequency. The center frequency is stepped across the bandwidth of the RF receiver. At each center frequency the two sinusoidal signals are input to the RF receiver and to the diode detector. The two sinusoidal signals are processed by both the receiver path and the calibrator path, and the results are used by the calibrator to generate coefficients for a correction filter in the receiver path at each of the stepped center frequencies.

6 Claims, 2 Drawing Sheets

MAGNITUDE AND PHASE RESPONSE CALIBRATION OF RECEIVERS

BACKGROUND OF THE INVENTION

The present invention relates to wide-band radio frequency (RF) receivers, and more particularly to a system for calibrating wide-band RF receivers for amplitude flatness and phase linearity.

Increased data bandwidth requirements have driven a need for RF receivers that not only receive signals with very wideband modulation, but also that maintain a flat amplitude and linear phase response over a wide bandwidth. As shown in FIG. 1, a wide-band digital RF receiver 10 has an input for receiving multiple RF signals from an antenna or other source. An image reject filter 12 band-limits the signal prior to a mixer 14. The mixer 14 down-converts the band-limited signal, using a local oscillator 16, to an intermediate frequency (IF). The IF signal from the mixer 14 is input to an amplifier 18 and filter 20, and then digitized in response to a receiver clock by an analog-to-digital converter (ADC) 22 to produce a stream of digitized samples. The samples are then mathematically measured or demodulated by algorithms in a digital signal processor (DSP) 24 to produce results for the input signals.

The RF receiver 10 is usually calibrated as part of the manufacturing process, and a finite impulse response (FIR) filter 26 is placed at the output of the ADC 22 prior to input of the digital sample stream to the DSP 24. The FIR filter coefficients are set by the manufacturer's calibration process, and serve to correct for amplitude flatness and phase linearity under those ideal conditions. However, each of the mixers, filters, amplifiers and other circuitry in the signal path from the input to the DSP 24 contribute amplitude ripples and group delay ripples, i.e., deviations from linear phase. These active components often exhibit temperature dependence in gain as well as changes in their frequency response. Further, as components age the amplitude and phase response also may be affected. It is often required to improve amplitude accuracy, amplitude flatness and phase linearity of the RF receiver 10.

What is desired is a method of calibrating the RF receiver at the time of use, i.e., at run-time, to correct amplitude flatness and phase linearity for temperature and other environmental dependencies in order to improve the accuracy of the measurement or demodulation algorithms used in the DSP.

BRIEF SUMMARY OF THE INVENTION

Accordingly the present invention provides for magnitude and phase response calibration of RF receivers that provides amplitude flatness and phase linearity over a wide frequency bandwidth using a simple square law diode detector and a frequency-stepped two-tone source. A two-tone source generator provides two sinusoidal signals separated by a specified frequency delta about a center frequency. The center frequency is stepped across the wide frequency bandwidth of the RF receiver. At each center frequency the two sinusoidal signals of equal amplitude and of the same phase are input to the RF receiver and to the square law diode detector in an integrated calibrator. The two sinusoidal signals are processed by both the receiver path and the calibrator path, and the magnitude and phase results from the receiver path are combined with the beat frequency results from the calibrator path to generate coefficients for a finite impulse response filter in the receiver path at each of the stepped center frequencies.

The advantages and novel features of the present invention are apparent from the following detailed description when read in conjunction with the appended claims and attached drawing figures.

DETAILED DESCRIPTION OF THE INVENTION

Figure 1:
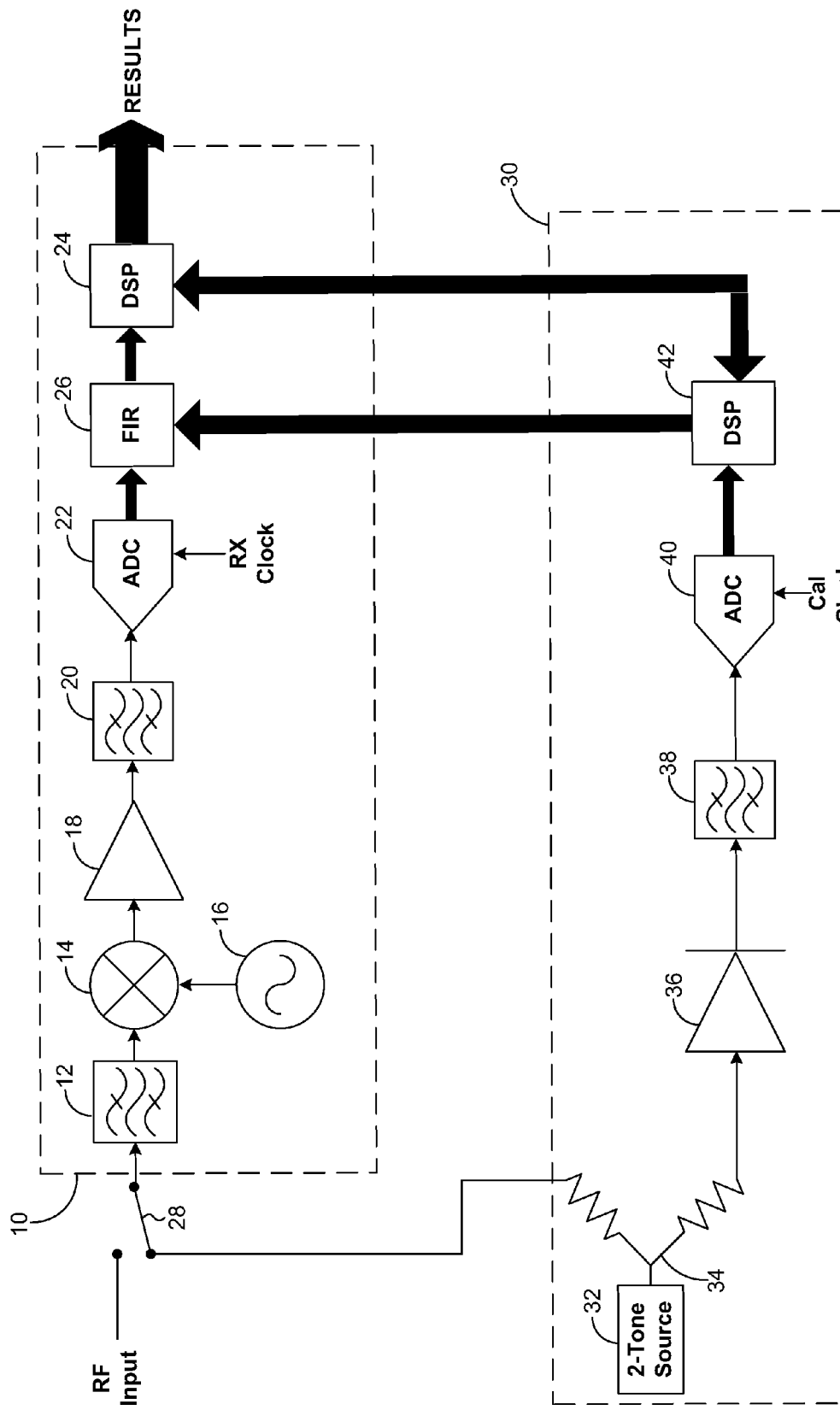
FIG. 1 is a block diagram view of a wide-band RF receiver with associated magnitude and phase calibrator according to the present invention.

Referring again to FIG. 1, an integrated calibrator 30 is shown in conjunction with the RF receiver 10. A two-tone source 32 produces two frequencies, or tones, separated by a fixed frequency. The two tones are stepped together across a wideband frequency range for the RF receiver 10. A symmetric broadband power divider 34 splits the two-tone signal from the two-tone source 32 to provide two identical signals, one of which is fed to the RF receiver input via a switch 28 and the other of which is fed to a calibrated diode 36 operating as a square law detector. Along with the usual amplitude information obtainable from the diode 36, a beat note at a frequency equal to the difference of the frequencies of the two tones is generated by the diode. The beat note contains both phase and magnitude phase information about the signals. The phase information is used in an algorithm to measure the phase response of the receiver signal path, as described below. A practical implementation of the integrated calibrator 30 includes an anti-alias filter 38 and ADC 40 responsive to a calibrator clock in the calibration signal path. A calibration DSP 42 generates coefficients for the FIR filter 26 that have an equal and opposite response to the amplitude and phase variations in the receiver path. The two ADCs 22, 40 may be clocked at different rates, but the clocks must have a known phase relationship. This known phase relationship is easily achieved if the two clocks are derived from a common reference clock.

The two-tone source 32 produces a signal centered at $\omega_m$ with tone separation of $\omega_\Delta$. The signal at the outputs of the power splitter 34 are described mathematically as $$x_{cal}(t) = a_1\cos(\omega_1 t + \phi_1) + a_2\cos(\omega_2 t + \phi_2).$$

$$\omega_m = \frac{\omega_1 + \omega_2}{2}.$$

$$\omega_\Delta = \omega_2 - \omega_1.$$

The diode 36 functions as a square law detector with a scaling factor $G_D(\omega)$. The output of the diode 36 is $$y_{det}(t) = G_D(\omega)[a_1\cos(\omega_1 t + \phi_1) + a_2\cos(\omega_2 t + \phi_2)]^2.$$

$$y_{det}(t) = G_D(\omega)\left\{\begin{array}{l}\frac{a_1^2}{2} + \frac{a_2^2}{2} + \frac{a_1^2}{2}\cos(2\omega_1 t + 2\phi_1) + \frac{a_2^2}{2}\cos(2\omega_2 t + 2\phi_2) + \\ a_1 a_2\cos[(\omega_\Delta)t + (\phi_2 - \phi_1)] + a_1 a_2\cos[2\omega_m t + \phi_1 + \phi_2]\end{array}\right\}$$

The output signal from the diode 36 is then filtered by the anti-aliasing filter 38 before being digitized by the ADC 40. The filter 38 removes the twice frequency terms, leaving $$y_{filt}(t) = G_D(\omega)\left\{\frac{a_1^2}{2} + \frac{a_2^2}{2} + a_1 a_2 \cos[(\omega_\Delta)t + (\phi_2 - \phi_1)]\right\}.$$

The gain of the diode 36 has both a magnitude, $G_D$, and phase, $\phi_D$, response. The diode 36 is a very broad band device whose magnitude response is flat over the spacing between the two tones.

$$G_D(\omega) = |G_D(\omega)| e^{j\theta_D(\omega)}$$

$$|G_D(\omega_1)| = |G_D(\omega_2)| = |G_D(\omega_m)|$$

Both the amplitude information and phase information are contained in the filtered signal. The DC level for each value of $\omega_m$ is $$y_{DC}(\omega_m) = |G_D(\omega_m)|\left(\frac{a_1^2}{2} + \frac{a_2^2}{2}\right).$$

The amplitude of the sinusoidal component is $$|y_{beat}(\omega_m)| = |G_D(\omega_m)| a_1 a_2$$

The phase difference between the two tones also is computed from the phase of the sinusoidal beat, not at the output of the diode 36.

$$\theta_{beat}(\omega_m) = (\varnothing_2 - \varnothing_1) + \varnothing_D(\omega_2) - \varnothing_D(\omega_1)$$

The signal in the receiver signal path is filtered and frequency converted, as described above. The mixer 14 translates the input frequency by $\omega_{LO}$. For simplicity, all frequency response terms are aggregated into an equivalent filter that encompasses all of the amplitude and phase responses of the entire signal path up to the ADC 22, $H_r(\omega)$.

$$H_r(\omega) = |H_r(\omega)| e^{j\varnothing_R(\omega)}$$

The signal at the input to the ADC 22 is described by $$x_{IF}(t) = a_1|H_r(\omega)|\cos[\omega_{LO} - \omega_1)t - \varnothing_1 + \varnothing_R(\omega_1)] + a_2|H_r(\omega_2)|\cos((\omega_{LO} - \omega_2)t - \varnothing_2 + \varnothing_R(\omega_2))$$

The signal contains two components separated by $\omega_\Delta$.

Fourier processing is performed on the received signal to determine the amplitude and phase of the two components as measured by the receiver DSP 24. The amplitude and phase of the lower and upper of the two tones is $$A_1(\omega_1) e^{j\theta_1(\omega_1)} = a_1|H_r(\omega_1)| e^{-j[\varnothing_1 - \varnothing_R(\omega_1)]}$$

$$A_2(\omega_2) e^{j\theta_2(\omega_2)} = a_2|H_r(\omega_2)| e^{-j[\varnothing_2(\omega_2) - \varnothing_R(\omega_2)]}$$

The product of the magnitude transfer function is calculated by taking the ratio of the products of the amplitudes of the two tones taken from the Fourier transform of the receiver DSP 24 to the level of the beat note measured by the square law detector, diode 36.

$$\frac{A_1(\omega_1) A_2(\omega_2)}{|y_{beat}(\omega_m)|} = \frac{a_2|H_r(\omega_2)| a_1|H_r(\omega_1)|}{|G_D(\omega_m)| a_1 a_2} = \frac{|H_r(\omega_2)||H_r(\omega_1)|}{|G_D(\omega_m)|}$$

If the spacing between the two tones is small enough, then the magnitude response of the two tones is equal.

$$|H_r(\omega_2)| = |H_r(\omega_1)| = |H_r(\omega_m)|$$

$$\frac{A_1(\omega_1) A_2(\omega_2)}{|y_{beat}(\omega_m)|} = \frac{a_2|H_r(\omega_2)| a_1|H_r(\omega_1)|}{|G_D(\omega_m)| a_1 a_2} = \frac{|H_r(\omega_2)||H_r(\omega_1)|}{|G_D(\omega_m)|}$$

The magnitude response of the receiver 10 is computed for each value of $\omega_m$ by stepping $\omega_m$ across the receiver's bandwidth and solving the following equation:

$$|H_r(\omega_m)| = \sqrt{\frac{A_1(\omega_1) A_2(\omega_2)|G_D(\omega_m)|}{|y_{beat}(\omega_m)|}}$$

The phase response also is computed from the phase readings taken from Fourier transform of the receiver DSP 24 and the phase of the beat note from the diode 36 as determined by the calibrator DSP 42.

$$\theta_1(\omega_1) - \theta_2(\omega_2) + \theta_{beat}(\omega_m) = [\varnothing_1 - \varnothing_R(\omega_1)] + [\varnothing_2 - \varnothing_R(\omega_2)] - [(\varnothing_2 - \varnothing_1) + \varnothing_D(\omega_2) - \varnothing_D(\omega_1)]$$

$$\theta_1(\omega_1) - \theta_2(\omega_2) + \theta_{beat}(\omega_m) = \varnothing_R(\omega_1) - \varnothing_R(\omega_2) + \varnothing_D(\omega_1) - \varnothing_D(\omega_2)$$

$$\varnothing_R(\omega_1) - \varnothing_R(\omega_2) = \theta_1(\omega_1) - \theta_2(\omega_2) + \theta_{beat}(\omega_m) - \varnothing_D(\omega_1) + \varnothing_D(\omega_2)$$

The group delay of the receiver path is computed from $$\tau_g(\omega_m) = \frac{\phi_R(\omega_1) - \phi_R(\omega_2)}{\omega_\Delta} = \frac{\theta_1(\omega_1) - \theta_2(\omega_2) + \theta_{beat}(\omega_m) - \phi_D(\omega_1) + \phi_D(\omega_2)}{\omega_\Delta}$$

The phase response of the receiver path is computed from the group delay by performing an integration.

$$\varnothing(\omega_m) = -\int \tau_g(\omega_m) d\omega_m + \varnothing_0$$

There are many techniques for determining FIR coefficients from a complex transfer function. One such method is to take the inverse Fourier transform of the complex transfer function. Another method is called the "window" method, as is well known to those in the art.

Figure 2:
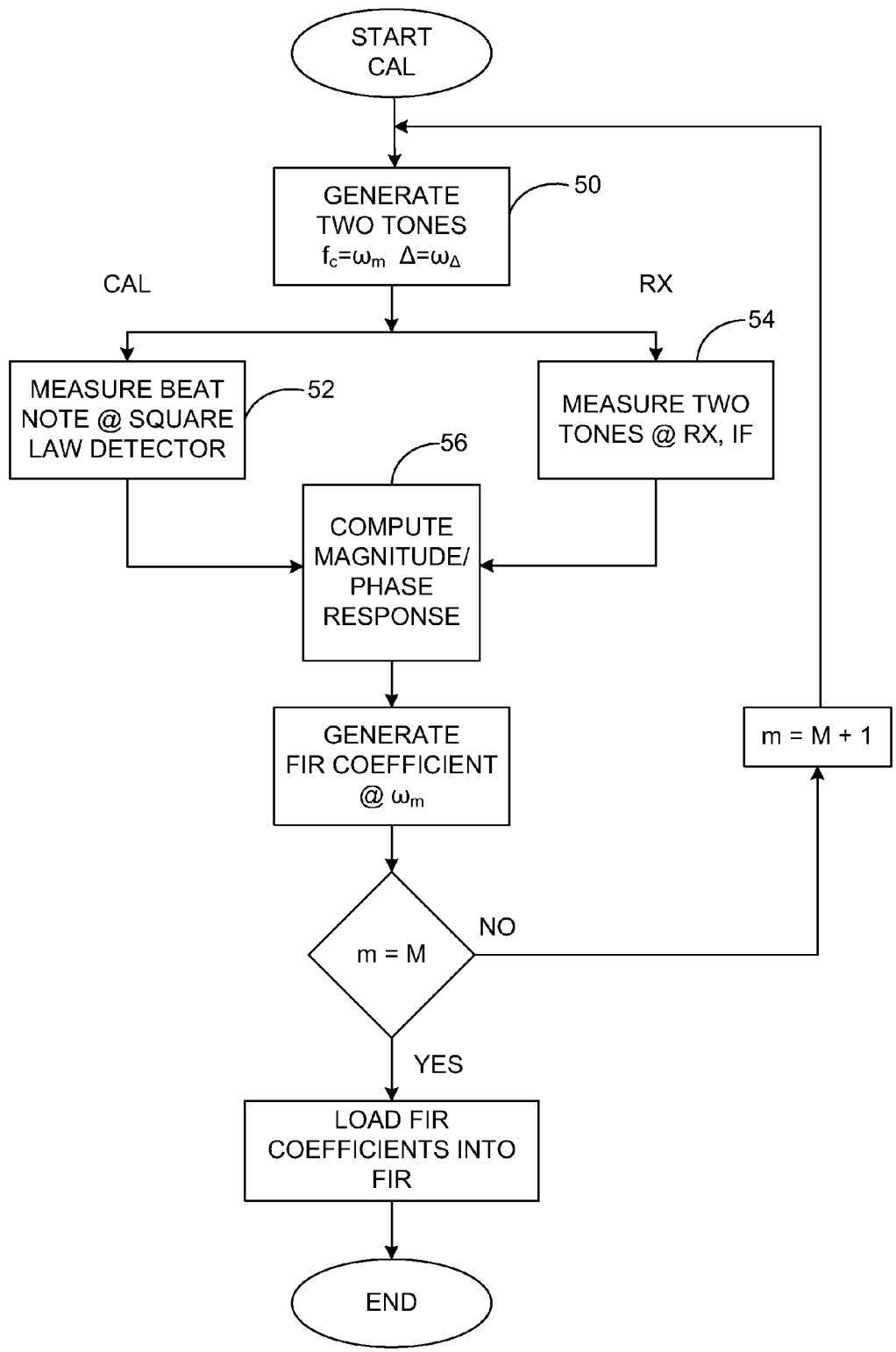
FIG. 2 is a flow diagram view of the wide-band RF receiver magnitude and phase calibration according to the present invention.

In summary as shown in FIG. 2, calibrating a receiver channel for flat amplitude and linear phase response uses the following steps:

1. Divide the receiver channel BW into M discrete frequencies, $\omega_m$.
  a. The two tone generator 32 produces two tones centered on $\omega_m$ with spacing $\omega_\Delta$ (step 50).
2. For each value of $\omega_m$.
  a. Measure the DC level and the level of the beat note at the output of the square law detector, and measure the phase of the beat note from the square law detector (step 52).
  b. Measure the amplitudes and phases of the two frequency components at the receiver IF, and compute the amplitudes of the two tones (step 54).
3. Compute the magnitude response using $$|H_r(\omega_m)| = \sqrt{\frac{A_1(\omega_1) A_2(\omega_2)|G_D(\omega_m)|}{|y_s(\omega_m)|}}$$

4. Compute the group delay response using $$\tau_g(\omega_m) = \frac{\theta_1(\omega_1) - \theta_2(\omega_2) + \theta_{beat}(\omega_m) - \phi_D(\omega_1) + \phi_D(\omega_2)}{\omega_\Delta}$$

5. Compute the phase response by integrating the group delay $$\emptyset(\omega_m) = \int \tau_g(\omega_m) d\omega_m + \emptyset_0$$

The integration process can have an arbitrary fixed offset $\emptyset_0$

6. Convert the phase response into FIR coefficients.

Thus the present invention provides an integrated calibrator for a receiver signal path that measures both magnitude and group delay (phase after integration), the calibrator having a two tone source with constant separations and selectable center frequency and including a calibrated diode detector and a method for digitizing the diode output, where the two tones are input to the receiver signal path and the calibrator path, measured in each path and combined by the calibrator to generate filter coefficients for a correction filter in the receiver signal path to produce amplitude flatness and phase linearity across the RF bandwidth of the receiver.

What is claimed is:

1. An integrated calibrator for a wide-band radio-frequency receiver having an input for receiving a radio-frequency signal, means for converting the input radio-frequency signal to an intermediate frequency signal, a digitizer for converting the intermediate frequency signal to digital samples, a correction filter for filtering the digital samples and a receiver processor for converting the filtered digital samples to useful results, the integrated calibrator comprising:

a two-tone source for generating a pair of sinusoidal signals separated by a specified delta frequency about a center frequency, the two-tone source being able to step the center frequency across a frequency range corresponding to the wide-band radio-frequency receiver;

a calibrated diode operating as a square law detector, the calibrated diode having an input and an output;

a splitter coupled to receive the pair of sinusoidal signals from the two-tone source and providing two sets of the pair of sinusoidal signals at respective outputs of the splitter, the sets having equal amplitudes and being in phase, one output of the splitter being coupled to the input of the radio-frequency receiver and the other output of the splitter being coupled to the input of the calibrated diode;

means for processing the output from the calibrated diode for comparison with the useful results from the wide-band radio-frequency receiver processor to produce coefficients for the correction filter at each of the center frequencies;

whereby the wide-band radio-frequency receiver has amplitude flatness and phase linearity across the frequency range.

2. The integrated calibrator as recited in claim 1 wherein the processing means comprises:

means for converting the output from the calibrated diode to digital samples; and a calibrator processor having the digital samples from the converting means as a first input and the useful results from the receiver processor as a second input, and producing as an output the filter coefficients for input to the correction filter.

3. The integrated calibrator as recited in claim 2 wherein the converting means comprises:

a bandpass filter having as an input the output from the calibrated diode to produce a filtered output; and an analog-to-digital converter having the filtered output as an input to produce the digital samples as an output.

4. A method of run-time calibration of a wide-band radio-frequency receiver for amplitude flatness and phase linearity across a frequency band of the wide-band radio-frequency receiver comprising the steps of:

generating a two-tone sinusoidal signal having a center frequencies and two frequencies separated by a specified frequency;

applying the two-tone sinusoidal signal to an input of the wide-band radiofrequency receiver and to a calibrated diode as part of an integrated calibrator for the wide-band radio-frequency receiver, the calibrated diode operating as a square law detector to produce a calibrator output;

processing the two-tone sinusoidal by the wide-band radio-frequency receiver to produce receiver results and by the integrated calibrator of the calibrator output to produce calibrator results;

calculating from the receiver results and calibrator results filter coefficients for a correction filter in the wide-band radio-frequency receiver to produce the amplitude flatness and phase linearity.

5. The method as recited in claim 4 wherein the processing step comprises the step of converting the calibrator output to digital samples for input to the calculating step as the calibrator results.

6. The method as recited in claim 5 wherein the converting step comprises the steps of:

bandpass filtering the calibrator output to produce a filtered calibrator output; and digitizing the filtered calibrator output to produce the digital samples.

* * * * *